Patented Aug. 8, 1950

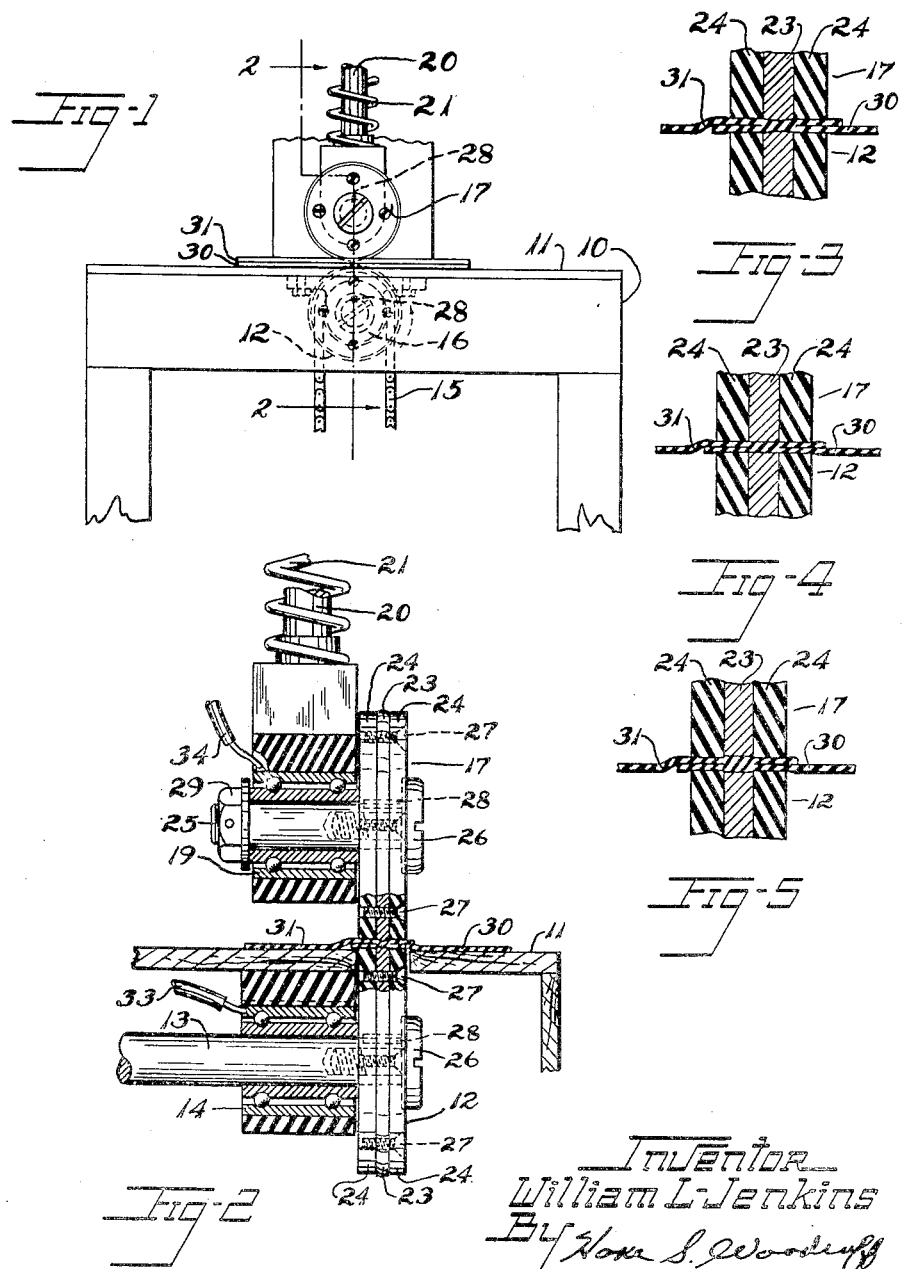

2,517,672

UNITED STATES PATENT OFFICE 2,517,672

APPARATUS FOR DIELECTRIC HEAT SEALING OF THERMOPLASTIC MATERIALS

William L. Jenkins, Akron, Ohio, assignor to The B. F. Goodrich Company, New York, N. Y., a corporation of New York Application July 30, 1945, Serial No. 607,741

7 Claims. (Cl. 154—42)

This invention relates to the dielectric heat-sealing of thermoplastic dielectric materials and particularly to apparatus for dielectrically heat-sealing such materials.

Thermoplastic dielectric materials heretofore have been joined together by applying the heating effects of an electrostatic field to overlapped material until the contiguous surfaces of the material are heat-softened, in which condition pressure is applied to effect a bond. One form of apparatus used to join thermoplastic material in a seam-like bond is commonly known as the "electronic sewing machine." Known forms of the latter apparatus suffer serious defects in that the thermoplastic material is extruded from beneath the electrodes in the heat-softened condition with consequent reduction in thickness of the material at the seams and cutting and marring of the surface of the material. Frequently the reduction in thickness is so serious as to amount to cutting entirely through the heat-softened material. Another drawback of prior forms of this apparatus is the crimping and puckering of the material caused by sticking of the heat-softened plastic to the cooler metal electrodes. Further difficulty in the past has been encountered in obtaining smooth clean-cut seams especially when sealing very thin sheet material.

The present invention accordingly contemplates the minimization and often complete elimination of the above-mentioned difficulties and aims to provide an apparatus which will dielectrically heat-seal thermoplastic dielectric material with superior seam-like bonds and with greater speed and efficiency than is possible with existing equipment.

In the present invention I have discovered a manner of producing clean-cut and permanent seam-like bonds between two members of thermoplastic dielectric material. I have found that a dielectric heat-sealing apparatus or "sewing machine" provided with relatively thin, rotatable metallic disc electrodes will produce highly desirable results when the electrodes are provided with auxiliary supporting discs of a hard dielectric material secured to the metal disc electrode so as to form a laminar electrode member. The auxiliary dielectric discs effectively support the metal electrode in contact with the heat-softened plastic material since the thermoplastic material beneath the dielectric discs is not heated substantially by the electrostatic field. Thus it is seen that while heat is applied to a localized area of the thermoplastic material, pressure is simultaneously applied adjacent but outside of that localized heated area to confine the heat-softened thermoplastic material to the heated area between the electrodes. The supporting discs may be one or more in number and may be secured on either side of the electrode disc or on both sides thereof. The periphery of the electrodes may have a variety of configurations for different applications.

The invention will now be described in greater detail with reference to the accompanying drawings of which, Fig. 1 is a fragmentary side elevational view of a form of the apparatus of this invention illustrating a preferred manner of disposing the electrodes and a suitable manner of actuating them.

Fig. 2 is a detailed view partly in section along line 2—2 of Fig. 1.

Fig. 3 is a partial view of the apparatus shown in Fig. 2 showing on an enlarged scale a localized section taken along line 2—2 of Fig. 1, more particularly through the two electrodes and the material being bonded, and showing an electrode having a crowned electrode disc projecting very slightly beyond the periphery of the dielectric supporting discs.

Fig. 4 is an enlarged sectional view similar to that of Fig. 3 but showing modified electrodes having a flat peripheral surface.

Fig. 5 is an enlarged sectional view similar to that of Figs. 3 and 4 but showing electrodes having each electrode disc recessed slightly below the periphery of the adjacent dielectric supporting discs or rims.

Referring to the drawings, the illustrative apparatus comprises a table or bench 10 having a flat top 11 upon which the work may be positioned for movement through the apparatus. A lower electrode 12 is mounted on shaft 13 which is journaled in ball bearings 14 with the outer circumference or periphery of the electrode substantially flush with the table top 11 or projecting very slightly above the table top 11 as shown in Fig. 2. The lower electrode may be driven by any convenient source of motive power such as an electric motor (not shown) acting through chain 15 and sprocket 16.

An upper electrode 17 is rotatably mounted in ball bearings 19 upon a vertically movable arm 20. The arm 20 may be moved upwardly and downwardly by the operator by means of a lever and arm linkage (not shown). The arm 20 is provided with a helical spring 21 under compression to exert a pressure downwardly against the work and the lower stationary electrode 12.

The electrodes in a preferred form are identical and comprise a central relatively thin metal disc portion 23, preferably slightly crowned as shown, and two auxiliary side discs 24, 24 of a hard dielectric material mounted respectively on shafts 13, 25 and secured thereon as by screws 26, 26. The metallic discs and dielectric discs are secured together by screws 27, 27 and by keys 28, 28. The short shaft 25 may be locked against axial movement by a nut 29.

The leads 33, 34 are electrically connected through the respective bearings and shafts to the electrode discs 23, 23 and to any conventional source of high frequency alternating current such as a radio frequency generator of the type now commercially available. The apparatus of the invention may be operated with high frequency alternating currents of frequencies of the order of 1, 10, 20, 50, 100 megacycles or even greater if desired.

In operation of the apparatus the upper electrode 17 is raised slightly to permit arrangement of the work on the table top 11 in position over the lower electrode 12. Two sheets of thermoplastic dielectric material 30, 31 are lapped or folded in any manner desired and placed in position as is shown in Figs. 2 and 3. Electrode 17 is then lowered in contact with the work while electrode 12 is set in motion and the work guided by the seamstress or operator in its passage between the electrodes while a high frequency alternating potential is supplied to the electrode.

In the interest of safety it may be convenient to have the electric circuit arranged so that raising and lowering the electrode 17 will turn the high frequency alternating current on and off.

A typical seam-bond as produced by the apparatus of this invention is smooth and neat and is sharp of outline. By examining the cross section of Fig. 3 it is seen that the two-ply thickness of the material is not appreciably reduced by the bonding operation. The latter fact adds to the strength and durability of the bond. Further the metal electrode disc by reason of its crown shape does not produce a sharply creased indentation in the surface of the material which might serve as a starting point for tearing or ripping of the material.

The apparatus of this invention produces a seam-bond with little or no tearing, cutting or puckering of the material and with greater speed and efficiency for, as discussed above, the electrode does not sink into the heat-softened material. The difficulty of sticking of the softened thermoplastic material to the cooler metallic electrodes is eliminated for the plastic material is confined between the electrodes and cannot be extruded to the side of the electrodes to adhere thereto. A further advantage noted in the operation of the apparatus of this invention is that the electrode may be allowed to run over the end of the material without cutting or tearing of the edge of the material. Furthermore, slight inaccuracies in the guiding of the work are not as apt to result in tearing or puckering of the material for the wider electrode has a smoothing action on the material.

It will be understood that for each different material, or for varying thicknesses of the same material, it may be necessary to vary the overall thickness of the electrodes and/or the dielectric supporting discs or rims and that for different type seams it may be necessary to change the circumferential configuration of the electrodes. Fig. 3 shows a preferred electrode arrangement for use in producing relatively narrow linear seam-bonds in relatively thin sheet-like material. The slightly crowned shape of the electrode disc and its projection slightly beyond the supporting rims produces a slight increase in pressure at the bond sufficient to improve the sharpness and strength of the bond. Fig. 4 shows a modified electrode having a flat peripheral configuration in which the metal electrode and adjacent dielectric discs terminate flush with each other. Such arrangement is desirable for use with thicker materials, for with such an electrode it is possible to exert greater pressure upon the material, the perfectly flat configuration preventing cutting or sinking into the plastic material. Fig. 5 shows a further modified electrode having the electrode disc recessed below the periphery of the supporting rims. This electrode may be used with those extremely thermoplastic materials with which it is desirable to prevent direct contact between the metal electrode and the thermoplastic material.

It must be understood also, that it may not be necessary in all cases to have a supporting disc or rim on both sides of the electrode disc but rather it may sometimes be desirable to have a supporting rim on only one side of the electrode disc. It is also possible to produce a multiple seam by having one or more electrode discs separated from each other and enclosed within supporting discs of a dielectric material.

One of the laminar electrodes may be replaced by an all-metal electrode although with some sacrifice in satisfaction of results and with possibly some undesirable heating of the dielectric discs on the laminar electrode.

The electrode discs may be made of any appropriate conducting material such as brass, copper, or steel. It has been found advantageous to give the peripheral surface of the electrode discs a smooth chromium coating for this further reduces sticking and encrusting of the heat-softened plastic material to the metal. The dielectric supporting discs or rims may be made of any hard dielectric material such as hard rubber, polystyrene, polyacrylates, Bakelite, or any other common molding plastics which are not too readily heated by the high frequency electrostatic field.

The materials which may be heat-bonded by the apparatus of this invention are well known and enjoy wide use in industry among which are: plasticized polyvinyl chloride and allied polymers such as copolymers of vinyl chloride with vinyl acetate, vinylidene chloride and the like, polyvinyl acetate, rubber hydrochloride film, Celluloid, cellulose acetate and the like, and practically any other thermoplastic dielectric material which becomes sticky and tacky when heated.

Having described my invention in considerable detail together with detailed descriptions of typical embodiments of the same, it is my intention that the invention be not limited by these details but rather construed broadly within the spirit and scope of the appended claims.

I claim:

1. An apparatus for the dielectric heat-sealing of thermoplastic material, said apparatus comprising a pair of rotatable wheel-like electrodes having their peripheral surfaces opposed, each of said electrodes comprising discs of hard dielectric material disposed on both sides of a central metallic disc axially adjacent thereto to provide a laminar structure, means for supplying a high frequency alternating field to the metallic portion of said electrodes, means for positively driving one of said electrodes for the purpose of advancing said material between said electrodes, and means for causing said electrodes to press upon said material passing therebetween, the peripheral surfaces of said discs of hard dielectric material being adapted to bear upon the surfaces of the thermoplastic material passing between said electrodes to limit the extent to which said central metallic discs press upon said thermoplastic material.

2. Apparatus for heat-sealing thermoplastic dielectric material, said apparatus comprising a pair of axially spaced apart rotatable cylindrical members of hard dielectric material, a second pair of axially spaced apart rotatable cylindrical members of hard dielectric material having their peripheral surfaces opposed to the peripheral surfaces of the first said pair, means for positively rotating at least one of said pairs of cylindrical members to advance said thermoplastic dielectric material between said opposed peripheral surfaces, means for pressing said pairs of rotatable members toward each other to clamp said thermoplastic dielectric material between said opposed peripheral surfaces, and means disposed in the space between each said pair of cylindrical members for applying a high frequency alternating field to said thermoplastic dielectric material.

3. Apparatus as defined in claim 2 in which the peripheral surface of at least one cylindrical metal electrode projects slightly beyond the peripheral surfaces of the axially adjacent cylindrical members.

4. Apparatus as defined in claim 2 in which the peripheral surface of each cylindrical metal electrode is flush with the peripheral surfaces of the axially adjacent cylindrical members.

5. Apparatus as defined in claim 2 in which the peripheral surface of at least one cylindrical metal electrode is recessed slightly below the peripheral surfaces of the axially adjacent cylindrical members.

6. Apparatus for heat-sealing layers of thermoplastic dielectric material by the heating effect of a high frequency electrostatic field, said apparatus comprising, in combination, rotatable roller electrodes having their peripheral surfaces opposed, at least one of said electrodes comprising a pair of axially spaced cylindrical members of hard dielectric material and between said cylindrical members an axially adjacent cylindrical metallic member, means for positively rotating at least one of said electrodes to advance said layers of thermoplastic dielectric material between the opposed peripheral surfaces of said electrodes, means for pressing said electrodes toward each other to clamp said layers between the peripheral surface of said cylindrical member of hard dielectric material and the opposed peripheral surface, and means for simultaneously supplying a high frequency alternating current to said cylindrical metallic member and to said opposing roller electrode.

7. Apparatus for heat-sealing thermoplastic material comprising a pair of axially spaced apart rotatable cylindrical members of hard dielectric material, a cylindrical metal electrode disposed in the space between said cylindrical members and secured thereto, a second pair of axially spaced apart rotatable cylindrical members of hard dielectric material having their peripheral surfaces opposed to the peripheral surfaces of the first said pair, a second cylindrical metal electrode disposed in the space between said second pair of cylindrical members and secured thereto and having its peripheral surface opposed to the peripheral surface of the first said electrode, means for positively rotating at least one of said pairs of cylindrical members to advance the thermoplastic dielectric material between the opposing surfaces, means for pressing said pairs of cylindrical members toward each other to clamp the thermoplastic material between the opposing surfaces thereof, and means for establishing a high-frequency alternating field between said opposed electrodes.

WILLIAM L. JENKINS.

REFERENCES CITED

The following references are of record in the file of this patent:

UNITED STATES PATENTS

| Number | Name | Date |
|---|---|---|
| 2,289,618 | Young | July 14, 1942 |
| 2,401,991 | Walton | June 11, 1946 |
| 2,459,260 | Brown | Jan. 11, 1949 |

FOREIGN PATENTS

| Number | Country | Date |
|---|---|---|
| 555,054 | Great Britain | Aug. 3, 1943 |
| 119,013 | Australia | Sept. 26, 1944 |

OTHER REFERENCES

An article entitled "An Electric Sewing Machine," pages 90 to 93 inclusive, 160, 162, 164, 166, and 168 of the magazine "Electronics" for August 1943.